(12) United States Patent
Li

(10) Patent No.: US 11,574,506 B2
(45) Date of Patent: *Feb. 7, 2023

(54) FINGERPRINT IDENTIFICATION APPARATUS AND ELECTRONIC DEVICE

(71) Applicant: SHENZHEN GOODIX TECHNOLOGY CO., LTD., Guangdong (CN)

(72) Inventor: Huafei Li, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,892

(22) Filed: Feb. 10, 2022

(65) Prior Publication Data

US 2022/0165094 A1  May 26, 2022

Related U.S. Application Data

(63) Continuation of application No. 17/025,840, filed on Sep. 18, 2020, now Pat. No. 11,335,129, which is a (Continued)

(51) Int. Cl.
  *G06K 9/28*  (2006.01)
  *G06V 40/40*  (2022.01)
  (Continued)

(52) U.S. Cl.
  CPC ............ *G06V 40/40* (2022.01); *G06V 10/147* (2022.01); *G06V 40/1318* (2022.01)

(58) Field of Classification Search
  CPC ....... G06V 40/1382–40/1394; G06V 40/1318; G06V 40/1324
  See application file for complete search history.

(56) References Cited

U.S. PATENT DOCUMENTS

| 10,331,939 B2 | 6/2019 | He et al. |
| 10,579,853 B2 | 3/2020 | Zuo et al. |

(Continued)

FOREIGN PATENT DOCUMENTS

| CN | 204515800 U | 7/2015 |
| CN | 107690653 A | 2/2018 |

(Continued)

*Primary Examiner* — Brian Werner
(74) *Attorney, Agent, or Firm* — Scully Scott Murphy & Presser

(57) ABSTRACT

Embodiments of the present application disclose a fingerprint identification apparatus and an electronic device. The fingerprint identification apparatus is used to be disposed under a display screen and includes a first filter layer and a fingerprint sensor, and the first filter layer is disposed above the fingerprint sensor, the first filter layer includes a plurality of first filter units, and the plurality of first filter units are disposed in a region of the first filter layer corresponding to an edge region of the fingerprint sensor; sensing units of the edge region of the fingerprint sensor are configured to receive a light signal returned by a finger above the display screen and filtered by the plurality of first filter units; and sensing units of a middle region of the fingerprint sensor are configured to receive a light signal returned by the finger, to generate a fingerprint image of the finger.

17 Claims, 6 Drawing Sheets

Related U.S. Application Data continuation of application No. PCT/CN2020/080067, filed on Mar. 18, 2020.

(51) Int. Cl.
   *G06V 10/147* (2022.01)
   *G06V 40/13* (2022.01)

(56) References Cited

U.S. PATENT DOCUMENTS

| | | |
|---|---|---|
| 2009/0046903 A1 | 2/2009 | Corcoran et al. |
| 2013/0119237 A1 | 5/2013 | Raguin et al. |
| 2017/0085813 A1 | 3/2017 | Reinhold et al. |
| 2018/0322322 A1 | 11/2018 | Zhou |
| 2019/0012512 A1 | 1/2019 | He et al. |
| 2019/0057237 A1 | 2/2019 | Zuo et al. |
| 2019/0157337 A1* | 5/2019 | Lin ............... H01L 27/14621 |
| 2019/0180072 A1 | 6/2019 | Fomani et al. |
| 2019/0362120 A1 | 11/2019 | Yazdandoost et al. |
| 2020/0074134 A1 | 3/2020 | Lim et al. |
| 2020/0097696 A1 | 3/2020 | Yao et al. |
| 2020/0193138 A1 | 6/2020 | Li et al. |
| 2020/0293738 A1 | 9/2020 | Zhang et al. |
| 2020/0293741 A1 | 9/2020 | Du |
| 2020/0401782 A1 | 12/2020 | Cheng et al. |
| 2020/0410202 A1 | 12/2020 | Lin et al. |
| 2021/0064842 A1 | 3/2021 | Östlund |
| 2021/0383089 A1 | 12/2021 | Ye |

FOREIGN PATENT DOCUMENTS

| | | |
|---|---|---|
| CN | 107767835 A | 3/2018 |
| CN | 109313706 A | 2/2019 |
| CN | 109934137 A | 6/2019 |
| CN | 109983471 A | 7/2019 |
| CN | 110088768 A | 8/2019 |
| CN | 210091189 U | 2/2020 |
| CN | 210091193 U | 2/2020 |
| EP | 3620901 A1 | 3/2020 |
| EP | 3657381 A1 | 5/2020 |
| KR | 20180001904 A | 1/2018 |
| KR | 20190041349 A | 4/2019 |

* cited by examiner

FINGERPRINT IDENTIFICATION APPARATUS AND ELECTRONIC DEVICE

CROSS-REFERENCE TO RELATED APPLICATIONS

This application is a continuation of U.S. patent application Ser. No. 17/025,840, filed on Sep. 18, 2020, which is a continuation of international application No. PCT/CN2020/080067, filed on Mar. 18, 2020. All of the aforementioned patent applications are hereby incorporated by reference in their entireties.

TECHNICAL FIELD

Embodiments of the present application relate to the field of fingerprint identification, and in particular, to a fingerprint identification apparatus and an electronic device.

BACKGROUND

The application of an optical fingerprint identification apparatus brings safe and convenient user experience to a user, however a fake fingerprint such as a fingerprint mold and a printed fingerprint image made of an artificial material (for example, silica gel, white glue) is a potential safety hazard in fingerprint application. Therefore, how to identify a real or false fingerprint to improve security of fingerprint identification is an urgent problem to be solved.

SUMMARY

Embodiments of the present application provide a fingerprint identification apparatus and an electronic device, which could improve security and speed of fingerprint identification.

In a first aspect, provided is a fingerprint identification apparatus, where the fingerprint identification apparatus is used to be disposed under a display screen and includes a first filter layer and a fingerprint sensor, and the first filter layer is disposed above the fingerprint sensor, the first filter layer includes a plurality of first filter units, and the plurality of first filter units are disposed in a region of the first filter layer corresponding to an edge region of the fingerprint sensor; sensing units of the edge region of the fingerprint sensor are configured to receive a light signal returned by a finger above the display screen and filtered by the plurality of first filter units, to detect whether the finger is a real finger; and sensing units of a middle region of the fingerprint sensor are configured to receive a light signal returned by the finger, to generate a fingerprint image of the finger.

According to the present application, whether the finger above the display screen is a real finger may be determined according to the light signal received by the sensing units of the edge region, and the fingerprint image for fingerprint identification may be obtained through the light signal received by the sensing units of the middle region. That is, the fingerprint identification apparatus captures the fingerprint image once, which may not only be used for authenticity identification, but also for fingerprint identification, and the security of fingerprint identification could be improved without affecting a fingerprint identification effect.

In addition, in the foregoing technical solution, the first filter units are disposed in the edge region of the fingerprint sensor, and the fingerprint image is mainly generated by the sensing units of the middle region of the fingerprint sensor. In this way, compared with the filter units disposed in the middle region, the influence of the filter units disposed in the edge region on the fingerprint image is greatly reduced. When the fingerprint image is processed, the fingerprint image may be generated directly according to the light signal received by the sensing units of the middle region without filling the data in the edge region. As a processing process of filling data is omitted, the solution of the embodiment of the present application can simplify a fingerprint identification process and improve the speed of fingerprint identification.

In some possible implementation manners, the first filter units include filter units in at least one color.

In some possible implementation manners, the first filter units include at least one of a red filter unit, a green filter unit, a blue filter unit, a cyan filter unit and a yellow filter unit.

In some possible implementation manners, the first filter units at least include a red filter unit.

In some possible implementation manners, the first filter units include a red filter unit, a green filter unit and a blue filter unit.

The accuracy of the authenticity of fingerprint identification may be improved by setting filter units in multiple colors.

In some possible implementation manners, two adjacent first filter units are different in color.

In some possible implementation manners, the plurality of first filter units are sequentially arranged in an order of a red filter unit, a green filter unit and a blue filter unit.

In some possible implementation manners, the plurality of first filter units are sequentially arranged in an order of a red filter unit, a red filter unit, a green filter unit, a green filter unit, a blue filter unit and a blue filter unit.

In some possible implementation manners, the plurality of first filter units are sequentially arranged in an order of a red filter unit, a green filter unit, a red filter unit, a green filter unit, a blue filter unit and a blue filter unit.

In some possible implementation manners, a number of red filter units is greater than a number of filter units in other colors.

The number of red filter units is designed to be greater than the number of filter units in other colors, so that even if an infrared filter layer is disposed between the first filter layer and the fingerprint sensor in the fingerprint identification apparatus, it may be ensured that a red fingerprint image for identifying a real or fake fingerprint has sufficient brightness, which could improve an identification effect of the red fingerprint image.

In some possible implementation manners, the edge region of the fingerprint sensor is a region where at least one circle of sensing units of an outermost side of the fingerprint sensor is located.

In some possible implementation manners, the edge region of the fingerprint sensor is a region where one or two or three circles of sensing units of an outermost side of the fingerprint sensor are located.

In some possible implementation manners, the first filter layer further includes a transparent region, and the transparent layer is a region of the first filter layer corresponding to the middle region of the fingerprint sensor, and the sensing units of the middle region of the fingerprint sensor are configured to receive a light signal returned by the finger and passing through the transparent region to generate a fingerprint image of the finger.

In some possible implementation manners, the first filter layer further includes a plurality of second filter units, and the plurality of second filter units are disposed in a region of the first filter layer corresponding to the middle region of the fingerprint sensor, where the plurality of second filter units and the plurality of first filter units are different in color, and the sensing units of the middle region of the fingerprint sensor are configured to receive a light signal returned by the finger and filtered by the plurality of second filter units to generate a fingerprint image of the finger.

In some possible implementation manners, the second filter units are monochromatic filter units.

In some possible implementation manners, the second filter units are green filter units.

Fingerprint identification using the fingerprint image in a green light wavelength band could improve fingerprint identification performance.

In some possible implementation manners, the second filter units are configured to filter out an infrared light signal.

In some possible implementation manners, the second filter layer is a layer of filter film formed on a surface of the fingerprint sensor by a film plating process.

In some possible implementation manners, one filter unit in the first filter layer corresponds to one sensing unit in the fingerprint sensor, and the one sensing unit is configured to receive a light signal returned by the finger and filtered by the corresponding one filter unit.

In some possible implementation manners, a second filter layer is further included, where the second filter layer is disposed between the first filter layer and the fingerprint sensor and is configured to filter out an infrared light signal.

In some possible implementation manners, a micro-lens array is further included, where the micro-lens array is disposed above the first filter layer and is configured to converge the light signal returned by the finger to sensing units of the fingerprint sensor.

In some possible implementation manners, at least one light shielding layer is further included, where the at least one light shielding layer is disposed between the micro-lens array and the fingerprint sensor, each of the at least one light shielding layer is provided with an array of small holes, and the array of small holes is configured to guide the light signal converged by the micro-lens array to sensing units of the fingerprint sensor.

In some possible implementation manners, a metal wiring layer is disposed inside the fingerprint sensor, and the metal wiring layer is one of the at least one light shielding layer.

In a second aspect, provided is an electronic device, including a display screen, and the fingerprint identification apparatus according to the first aspect and any one of possible implementation manner thereof.

DESCRIPTION OF EMBODIMENTS

Technical solutions in embodiments of the present application will be described hereinafter with reference to the accompanying drawings.

With the development of the times and the progress of science and technology, a screen-to-body ratio of an electronic product is getting higher and higher, and full screens have become a development trend of many electronic products. In order to adapt to the development trend of the full screen, photosensitive devices in the electronic product, such as a fingerprint identification apparatus and a front camera, are placed under the screen. Under-screen optical fingerprint identification technologies are the most widely used under-screen fingerprint identification technologies. Due to the particularity of an under-screen optical fingerprint device, light with a fingerprint signal is required to pass through a screen to a fingerprint sensor thereunder, to obtain a fingerprint signal.

Taking an under-screen optical fingerprint identification as an example, a fingerprint identification process is described in detail.

It should be understood that embodiments of the present application may be applied to an optical fingerprint system, including but not limited to an optical fingerprint identification system and a medical diagnostic product based on optical fingerprint imaging. The embodiments of the present application are only described by taking the optical fingerprint system as an example, which should not constitute any limitation to the embodiments of the present application, and the embodiments of the present application are also applicable to other systems using an optical imaging technology or the like.

As a common application scenario, the optical fingerprint system provided in an embodiment of the present application may be applied to portable or mobile computing devices such as a smart phone, a tablet computer and a game device, and other electronic devices such as an electronic database, an automobile and an automated teller machine (ATM), which is not limited in the embodiment of the present application; and the embodiment of the present application may be applied to other mobile terminals having display screens or other electronic devices. More specifically, in the foregoing electronic device, a fingerprint identification apparatus may be specifically an optical fingerprint apparatus, which may be disposed in a partial region or an entire region under a display screen, thereby forming an under-display optical fingerprint system. Alternatively, the fingerprint identification apparatus may be partially or entirely integrated into the interior of the display screen of the electronic device to form an in-display optical fingerprint system.

Figure 1:
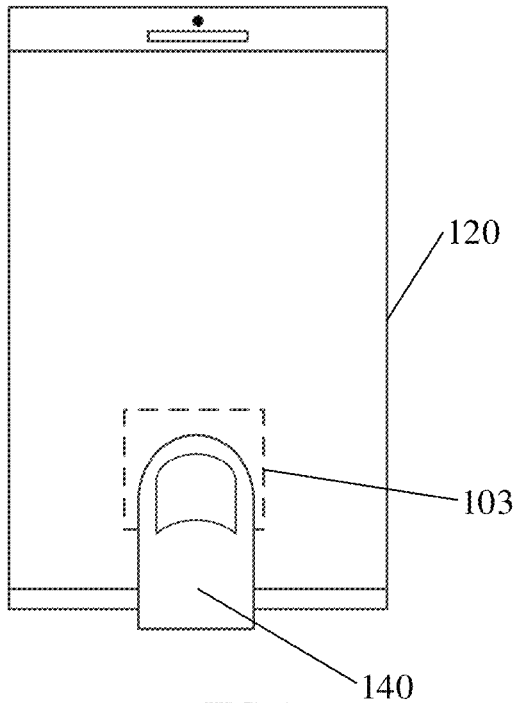
FIG. 1 is a schematic structural diagram of an electronic device to which an embodiment of the present application is applicable.
Figure 2:
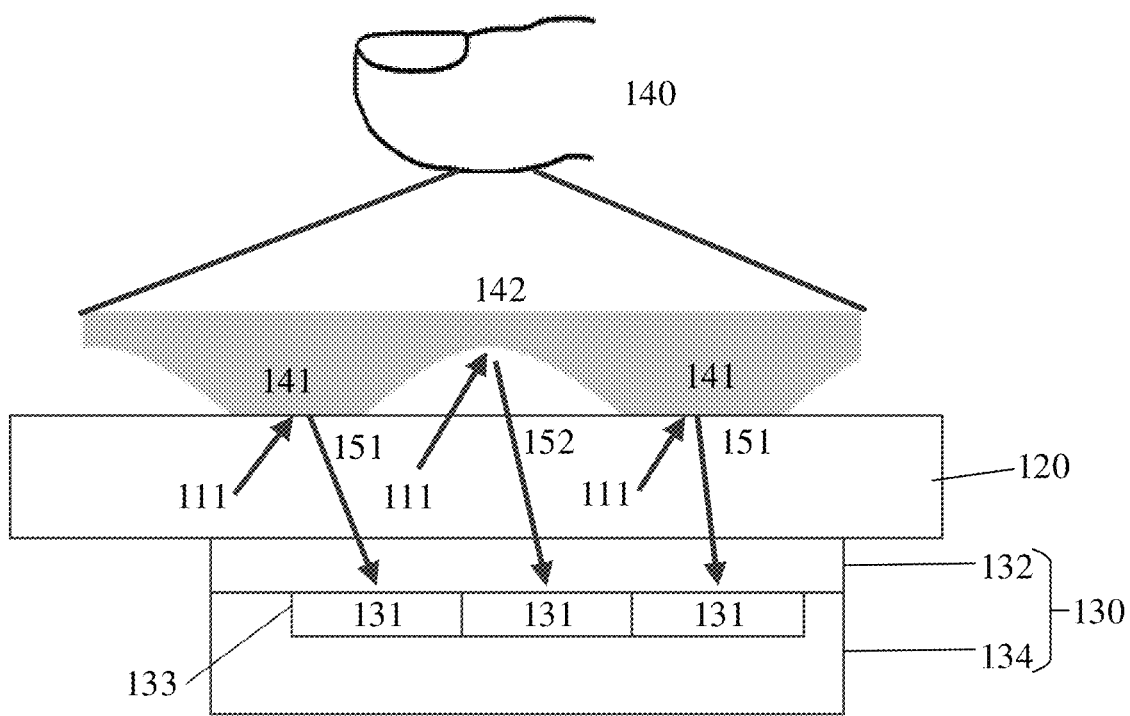
FIG. 2 is another structural diagram of an electronic device to which an embodiment of the present application is applicable.

FIG. 1 and FIG. 2 are two schematic structural diagrams of an electronic device to which an embodiment of the present application is applicable, where FIG. 1 is a top view and FIG. 2 is a side view. An electronic device 10 includes a display screen 120 and an optical fingerprint apparatus 130, where the optical fingerprint apparatus 130 is disposed in a partial region under the display screen 120. The optical fingerprint apparatus 130 includes an optical fingerprint sensor including a sensing array 133 having a plurality of optical sensing units 131, and a region where the sensing array is located or a sensing region thereof is a fingerprint detection region 103 corresponding to the optical fingerprint apparatus 130. As shown in FIG. 1, the fingerprint detection region 103 is located in a display region of the display screen 120. In an alternative embodiment, the optical fingerprint apparatus 130 may also be disposed at other positions, such as a side of the display screen 120 or an edge non-light transmitting region of the electronic device 10, and a light signal of at least part of the display region of the display screen 120 is guided to the optical fingerprint apparatus 130 through a light path design, such that the fingerprint detection region 103 is actually located in the display region of the display screen 120.

It should be understood that an area of the fingerprint detection region 103 may be different from an area of the sensing array of the optical fingerprint apparatus 130. For example, the area of the fingerprint detection region 103 corresponding to the optical fingerprint apparatus 130 may be larger than the area of the sensing array of the optical fingerprint apparatus 130 through for example, a lens imaging light path design, a reflective folding light path design or other light path designs such as light convergence or reflection. In other alternative implementation manners, if the light path is guided in a manner of, for example, light collimation, the area of the fingerprint detection region 103 corresponding to the optical fingerprint apparatus 130 may also be designed to be substantially identical with the area of the sensing array 133 of the optical fingerprint apparatus 130.

Therefore, when a user needs to unlock the electronic device or perform other fingerprint verification, fingerprint input may be achieved merely by a finger being pressed against the fingerprint detection region 103 located on the display screen 120. Since fingerprint detection may be implemented in the screen, there is no need to exclusively reserve space for a front surface of the electronic device 10 adopting the foregoing structure to set a fingerprint button (such as a Home button), so that a full screen solution may be adopted; that is, the display region of the display screen 120 may be substantially extended to an entire front surface of the electronic device 10.

As an optional implementation manner, as shown in FIG. 2, the optical fingerprint apparatus 130 includes a light detection portion 134 and an optical component 132. The light detection portion 134 includes the sensing array, a readout circuit and other auxiliary circuits electrically connected to the sensing array, which is fabricated in a die by a semiconductor process such as an optical imaging chip or an optical fingerprint sensor; the sensing array is specifically a photo detector array including a plurality of photo detectors distributed in an array, and the photo detectors may be used as the optical sensing unit as described above. The optical component 132 may be disposed above the sensing array of the light detection portion 134, and may specifically include a filter layer, a light guiding layer or a light path guiding structure, and other optical elements, the filter layer may be used to filter out ambient light passing through a finger, and the light guiding layer or light path guiding structure is mainly used to guide light reflected from a finger to the sensing array for optical detection.

In specific implementation, the optical component 132 and the light detection portion 134 may be encapsulated in the same optical fingerprint component. For example, the optical component 132 and the light detection portion 134 may be encapsulated in the same optical fingerprint chip, or the optical component 132 may be disposed outside a chip where the light detection portion 134 is located, for example, the optical component 132 is attached above the chip, or a part of elements of the optical component 132 are integrated into the chip.

There are various implementations for the light guiding layer or light path guiding structure of the optical component 132, for example, the light guiding layer of the optical component 132 may be specifically a collimator layer fabricated on a semiconductor silicon wafer, which has a plurality of collimating units or micro-pore arrays, and the collimating unit may be a small hole. Light in the reflected light reflected from the finger that is vertically incident to the collimating unit may pass through the collimating unit and be received by the optical sensing unit below it. However, light with an excessive large incident angle is attenuated through multiple reflection inside the collimating unit, therefore, each optical sensing unit may substantially only receive the reflected light reflected from a fingerprint pattern right above the optical sensing unit, and thus the sensing array may detect a fingerprint image of the finger.

In another embodiment, the light guiding layer or the light path guiding structure may also be an optical lens layer having one or more lens units, for example, a lens group composed of one or more aspheric lenses, and the optical component 132 may include a lens for converging reflected light reflected from the finger to the sensing array of the light detection portion 134 below it, so that the sensing array may perform imaging based on the reflected light so as to obtain the fingerprint image of the finger. Optionally, the optical lens layer may further be provided with a pinhole in the light path of the lens unit, and the pinhole may cooperate with the optical lens layer to expand the field of view of the optical fingerprint apparatus, to improve a fingerprint imaging effect of the optical fingerprint apparatus 130.

In other embodiments, the light guiding layer or the light path guiding structure may also specifically adopt a micro-lens layer having a micro-lens array constituted by a plurality of micro-lenses, which may be formed above the sensing array of the light detection portion 134 by a semiconductor growth process or other processes, and each micro-lens may correspond to one of the sensing units in the sensing array respectively. In addition, other optical film layers such as a dielectric layer or a passivation layer, may be disposed between the micro-lens layer and the sensing unit, and more specifically, a light shielding layer with a micro-pore may also be formed between the corresponding micro-lens layer and the sensing unit, where the micro-pore is formed between the corresponding micro-lens and the sensing unit, and the light shielding layer may shield optical interference between adjacent micro-lenses and the sensing units, such that light corresponding to the sensing unit is converged to the interior of the micro-pore through the micro-lens and is transmitted to the sensing unit through the micro-pore to perform optical fingerprint imaging. It should be understood that several implementations of the forgoing optical path guiding structure may be used alone or in combination, for example, a micro-lens layer may be further disposed under the collimator layer or the optical lens layer. Certainly, when the collimator layer or the optical lens layer is used in combination with the micro-lens layer, the specific laminated structure or light path may require to be adjusted according to actual needs.

Optionally, in some embodiments, the optical fingerprint apparatus 130 may include only one optical fingerprint sensor, and in this case, the fingerprint detection region 103 of the optical fingerprint apparatus 130 has a smaller area and a fixed position, therefore, when inputting the fingerprint, the user needs to press the finger at a specific position of the fingerprint detection region 103, otherwise the optical fingerprint apparatus 130 may not be able to capture the fingerprint image, thereby resulting in poor user experience.

In other alternative embodiments, the optical fingerprint apparatus 130 may specifically include a plurality of optical fingerprint sensors which may be disposed under the display screen 120 side by side in a splicing manner, and sensing regions of the plurality of optical fingerprint sensors collectively form the fingerprint detection region 103 corresponding to the optical fingerprint apparatus 130. In other words, the fingerprint detection region 103 corresponding to the optical fingerprint apparatus 130 may include a plurality of sub-regions, each sub-region corresponding to a sensing region of one of the optical fingerprint sensors, so that a fingerprint detection region 103 of the optical fingerprint apparatus 130 may be extended to a main region of a lower portion of the display screen, that is, it is extended to a region that is generally pressed by a finger, thereby achieving a blind pressing type of a fingerprint input operation. Alternatively, when the number of the optical fingerprint sensors is sufficient, the fingerprint detection region 103 may also be extended to a half of the display region or even the entire display region, thereby achieving half-screen or full-screen fingerprint detection.

It should be understood that, in a specific implementation, the electronic device 10 further includes a transparent cover, or referred to as a transparent protective cover; and the cover may be a glass cover or a sapphire cover, which is located above the display screen 120 and covers a front surface of the electronic device 10. Therefore, in the embodiment of the present application, the so-called finger being pressed against the display screen 120 actually refers to the finger being pressed against the cover above the display screen 120 or a surface of a protective layer covering the cover.

It should be understood that the display screen 120 in the embodiment of the present application may adopt a display screen with a self-emitting display unit, such as an organic light-emitting diode (OLED) display screen or a micro light-emitting diode (Micro-LED) display screen. Taking an OLED display screen as an example, the optical fingerprint apparatus 130 may use a display unit (that is, an OLED light source) of the OLED display screen 120 located at the fingerprint detection region 103 as an excitation light source for optical fingerprint detection. When a finger 140 is pressed against the fingerprint detection region 103, the display screen 120 emits a beam of light 111 to a target finger 140 above the fingerprint detection region 103, and the light 111 is reflected by a surface of the finger 140 to form reflected light or scattered light after scattering inside the finger 140.

It should be understood that for ease of description, the foregoing reflected light and scattered light are collectively referred to as reflected light. Since a ridge and a valley of a fingerprint have different light reflecting capabilities, reflected light 151 from the ridge 141 of the fingerprint and the reflected light 152 from the valley 142 of the fingerprint have different light intensities. After passing through the optical component 132, the reflected light is received by the sensing array 134 in the optical fingerprint apparatus 130 and converted into the corresponding electrical signal, that is, a fingerprint detection signal; and fingerprint image data may be obtained based on the fingerprint detection signal, and fingerprint matching verification may be further performed, thereby implementing an optical fingerprint identification function at the electronic device 10.

With the development of technology, fingerprint identification technology is applied in more and more electronic devices, and optical fingerprint identification apparatuses are the most widely used.

Figure 3:
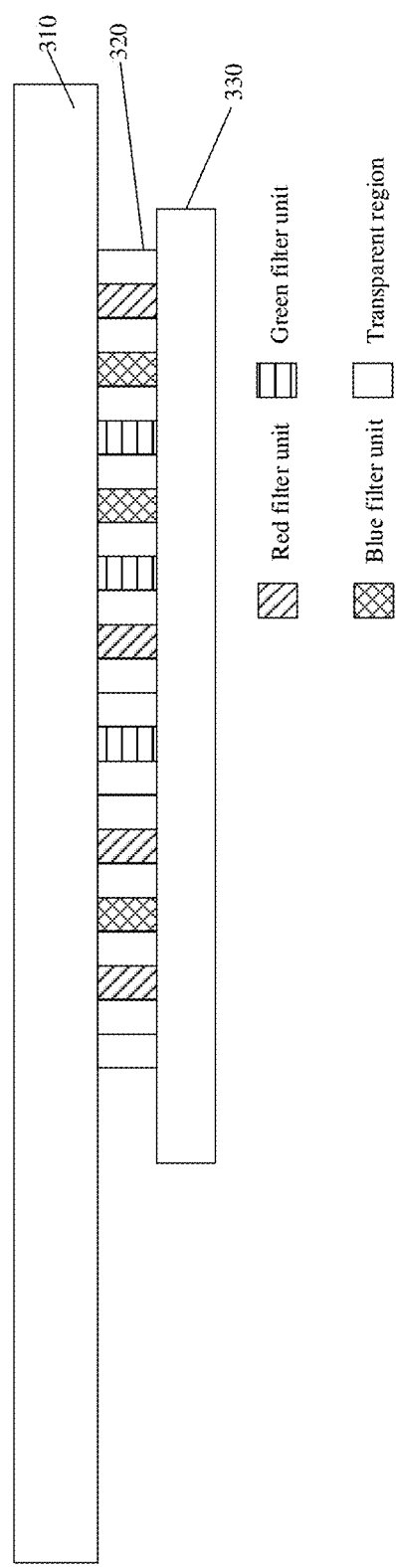
FIG. 3 is a schematic diagram of conventional distribution of filter units.

As shown in FIG. 3, an optical fingerprint identification apparatus may include a fingerprint sensor 330, and the fingerprint sensor 330 may be disposed under a display screen 310. The fingerprint sensor 330 may include a plurality of sensing units, which may be configured to receive a light signal returned by a finger above the display screen 310, and the light signal may be used for fingerprint identification.

For anti-counterfeiting or other purposes, the optical fingerprint identification apparatus needs to stably identify a component of light signals in one or more colors in the light signals returned by the finger. Since fingers of different users have different reflection intensities to light signals in different colors, the light signals in one or more colors may be used to identify a real or fake fingerprint.

In order to detect the component of the light signals in one or more colors, a filter layer 320 may be provided in the fingerprint identification apparatus, as shown in FIG. 3. The filter layer 320 may include a plurality of filter units, which may include a red filter unit, a green filter unit and a blue filter unit; the filter units in different colors may be configured to transmit light signals in different colors in the light signals returned from the finger, and the light signals may be used for identifying a real or fake fingerprint. For example, a red filter unit may be configured to transmit a red light signal, a green filter unit may be configured to transmit a green light signal, and a blue filter unit may be configured to transmit a blue light signal. Sensing units of the fingerprint sensor 330 may be configured to receive a light signal returned by the finger and filtered by the red filter unit, the green filter unit and the blue filter unit, and the light signal may be used for detecting whether the finger is a real finger.

Secondly, the filter layer 320 may also include a transparent region, and the sensing units of the fingerprint sensor 330 are also configured to receive a light signal returned by the finger and passing through the transparent region, and the light signal may be used to generate a fingerprint image of the finger to perform fingerprint identification.

Figure 4:
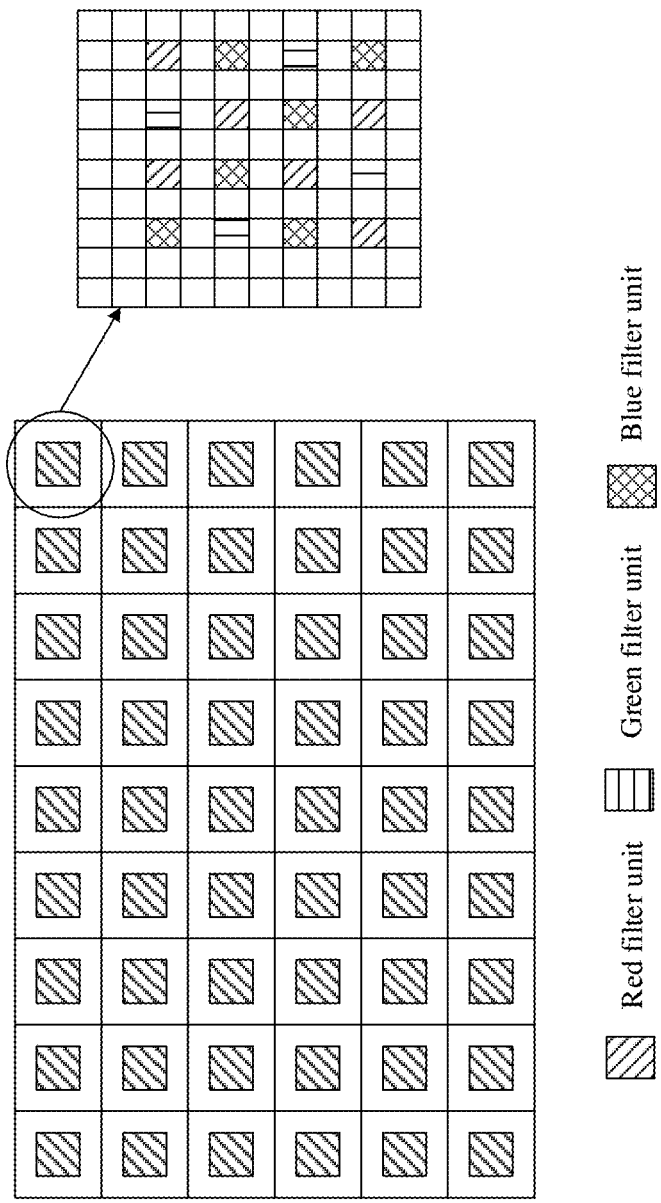
FIG. 4 is a schematic diagram of distribution of filter units in multiple colors.

At present, the plurality of filter units are distributed in a region of the filter layer corresponding to a middle region of the fingerprint sensor, there are various distribution forms of the plurality of filter units, and FIG. 4 shows one of the distribution forms.

The left side of FIG. 4 shows a schematic diagram of a distribution region of a plurality of filter units on a fingerprint sensor, where each shaded region represents a region where the filter units may be disposed, and an unshaded region represents a transparent region.

The right side of FIG. 4 shows an enlarged schematic diagram of a shaded region. One shaded region may include a plurality of filter units, and the plurality of filter units and the transparent regions may be alternatively arranged, i.e., two adjacent filter units are separated by the transparent region. Colors of the two adjacent filter units may be different. One filter unit corresponds to one sensing unit in the sensor.

The fingerprint image is mainly generated according to the light signal sensed by the sensing units of the middle region of the fingerprint sensor, and a large number of filter units are disposed in the middle region of the fingerprint sensor. Since the filter unit filters the light signal returned by the finger, the intensity of the light signal filtered by the filter unit is weaker than that of the light signal passing through the transparent region. If the fingerprint image is directly generated according to the light signal received by the sensing units, it will cause the sudden darkening of some positions of the fingerprint image and affect the fingerprint identification performance.

In order to solve the foregoing problem, before the fingerprint image is processed, it requires to fill the data where the filter unit is located with various algorithms. For example, pixel points around the filter unit may be used for filling.

In addition, since the most commonly used display screen is a self-luminous display screen, such as an OLED screen, the OLED screen itself is an LED dot matrix, and the sensing units of fingerprint sensor is also a dot matrix. Light emitted by the LED dot matrix directly illuminates the fingerprint sensor, which affects the light signal sensed by the sensing units in the fingerprint sensor. Upper surfaces of some sensing units are directly facing the LED, while others are not directly facing the LED, so that different sensing units affected by the LED differently. When filling the data where the filter unit is located, the sizes of the data to be filled in the pixel points at different locations are different, which further increases the complexity of filling.

Based on this, an embodiment of the present application provides a fingerprint identification apparatus, which could avoid filling the pixel points in the fingerprint identification process and reduce the complexity of data processing.

Figure 5:
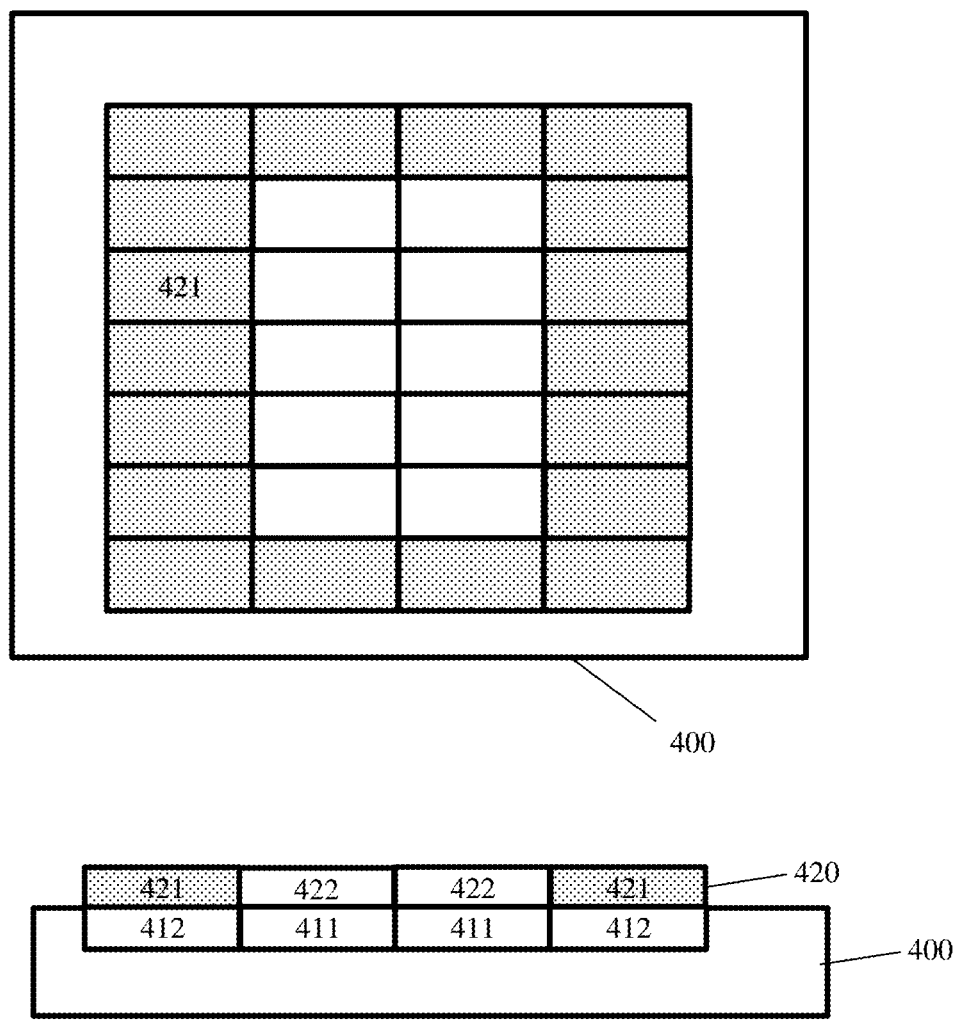
FIG. 5 is a schematic diagram of a fingerprint identification apparatus provided by an embodiment of the present application.

As shown in FIG. 5, a fingerprint identification apparatus 40 may be applied to an electronic device having a display screen, and may be disposed under the display screen. The fingerprint identification apparatus 40 may include a first filter layer 420 and a fingerprint sensor 400, and the first filter layer 420 is disposed above the fingerprint sensor 400.

The first filter layer 420 may include a plurality of first filter units 421, and the plurality of first filter units 421 are disposed in a region of the first filter layer 420 corresponding to an edge region of the fingerprint sensor 400.

Sensing units 412 of the edge region of the fingerprint sensor 400 may be configured to receive a light signal returned by a finger above the display screen and filtered by first filter units 421 to detect whether the finger is a real finger.

Sensing units 411 of a middle region of the fingerprint sensor may be configured to receive a light signal returned by the finger to generate a fingerprint image of the finger.

Whether the finger above the display screen is a real finger may be determined through the light signal captured by the sensing units 412, and the fingerprint image for fingerprint identification may be obtained through the light signal captured by the sensing units 411. That is, the fingerprint identification apparatus captures the fingerprint image once, which may not only be used for authenticity identification, but also for fingerprint identification, and the security of fingerprint identification could be improved without affecting a fingerprint identification effect.

In addition, in the foregoing technical solution, the first filter units are disposed in the edge region of the fingerprint sensor, and the fingerprint image is mainly generated by the sensing units of the middle region of the fingerprint sensor. In this way, compared with the filter units disposed in the middle region, the influence of the filter units disposed in the edge region on the fingerprint image is greatly reduced. When the fingerprint image is processed, the fingerprint image may be generated directly according to the light signal received by the sensing units of the middle region without filling the data in the edge region. As a processing process of filling data is omitted, the solution of the embodiment of the present application can simplify a fingerprint identification process and improve the speed of fingerprint identification.

The middle region of the fingerprint sensor and the edge region of the fingerprint sensor may be non-overlapping regions on the fingerprint sensor.

The first filter units may be configured to filter a light signal returned by the finger, and only allow a light signal in a specific color to be transmitted.

The first filter units may be filter units in at least one color, that is, the first filter units may be monochromatic filter units or filter units in two or more colors.

For example, the first filter units may include at least one of a red filter unit, a green filter unit, a blue filter unit, a cyan filter unit and a yellow filter unit.

As an implementation manner, the first filter units at least include a red filter unit.

If the first filter units are monochromatic filter units, the first filter units may be red filter units. Of course, the first filter units may also be filter units in other colors.

If the first filter units include filter units in multiple colors, preferably, the first filter units may include a red filter unit and other non-red filter units. For example, the first filter units may include a red filter unit and a green filter unit, or the first filter units may include a red filter unit and a blue filter unit, or the first filter units may include a red filter unit, a green filter unit and a blue filter unit.

The accuracy of the authenticity of fingerprint identification may be improved by setting filter units in multiple colors.

When the first filter units include filter units in multiple colors, ratios of the number of filter units in different colors to a total number of filter units may be equal or may not be equal, which is not specifically limited in the embodiment of the present application.

As an implementation manner, the number of red filter units may be designed to be greater than the number of filter units in other colors, so that even if an infrared filter layer is disposed between the first filter layer and the fingerprint sensor in the fingerprint identification apparatus, it may be ensured that a red fingerprint image for identifying a real or fake fingerprint has sufficient brightness, which could improve an identification effect of the red fingerprint image.

If the first filter units include filter units in multiple colors, arrangement orders of the filter units in multiple colors may be multiple, which is not specifically limited in the embodiment of the present application.

For example, colors of any two adjacent filter units are different. For another example, colors of some two adjacent filter units are the same, and colors of other two adjacent filter units are different.

Arrangement of filter units will be described with reference to FIGS. 6 to 8.

Figure 6:
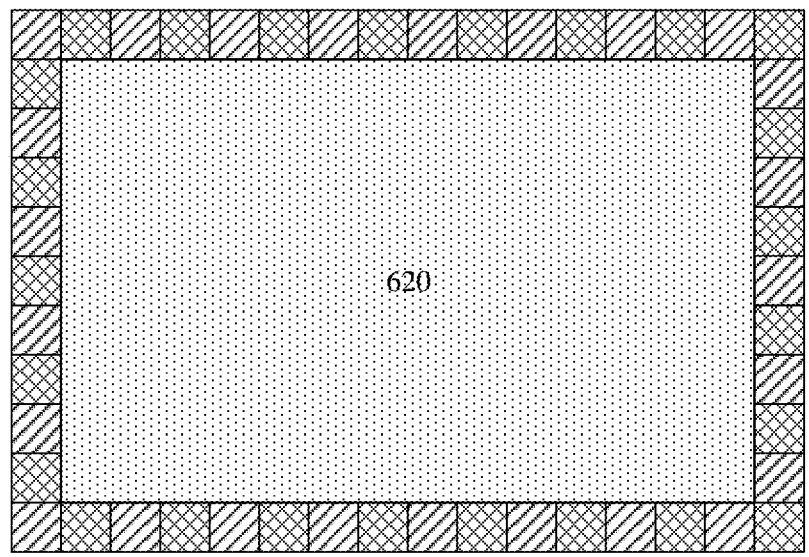
FIG. 6 to FIG. 8 are schematic diagrams of distribution of filter units in multiple colors in the first filter layer provided by an embodiment of the present application.
Figure 7:
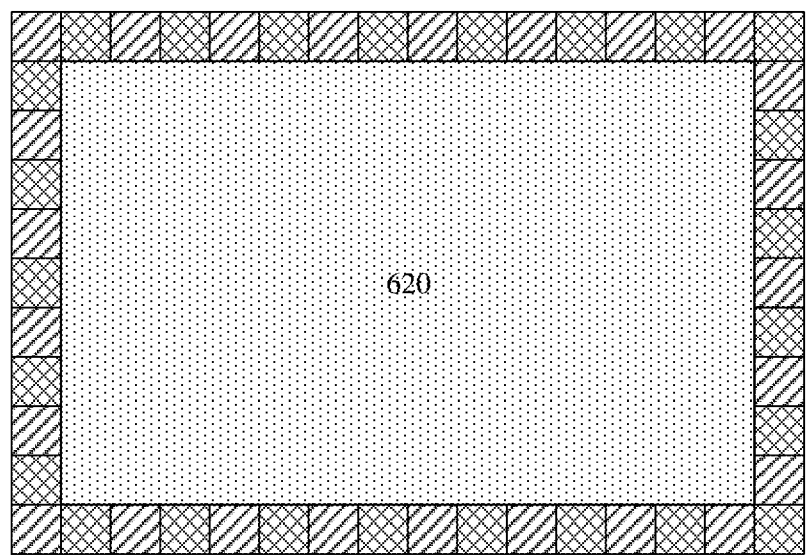

FIG. 6 and FIG. 7 show a case where first filter units include filter units in two colors, where the filter units in two colors may be arranged alternately.

Taking the first filter units including a red filter unit and a blue filter unit as an example, the red filter unit and blue filter unit are arranged alternately, that is, the first filter units may sequentially be arranged in an order of RBRB, as shown in FIG. 6.

The first filter units may sequentially be arranged in an order of RRBBRRBB, as shown in FIG. 7. Or, the first filter units may sequentially be arranged in an order of RRBRB; and in this case, the number of red filter units is greater than that of blue filter units.

Figure 8:
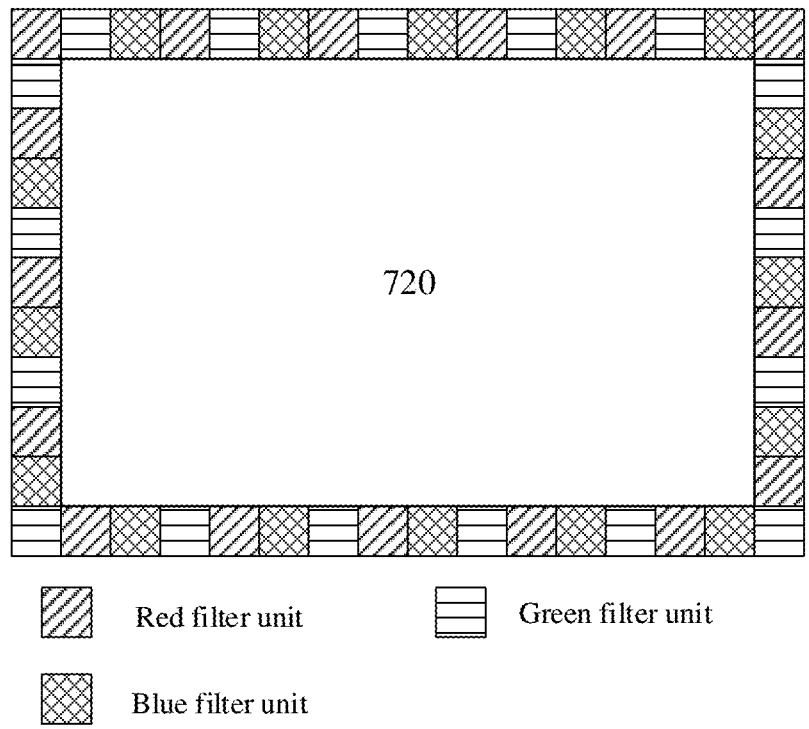

FIG. 8 shows a case where first filter units include filter units in three colors, where the filter units in three colors may be arranged in any one of permutations.

Taking the first filter units including a red filter unit, a green filter unit and a blue filter unit as an example, the first filter units may sequentially be arranged in an order of RGBRGB, as shown in FIG. 8. Or, the first filter units may sequentially be arranged in an order of RGRGBB. Or, the first filter units may sequentially be arranged in an order of RRGGBB.

It should be noted that in the foregoing, R may represent a red filter unit, B represents a blue filter unit, and G represents a green filter unit.

In an embodiment of the present application, a wavelength band range of a blue filter plate may be 440 nm to 475 nm in a center wavelength band and 550 nm in an upper cut-off wavelength band, and transmittance of blue light is higher than that of green light and red light; a wavelength band range of a green filter plate may be 520 nm to 550 nm in a center wavelength band, 620 nm and 460 nm in upper and lower cut-off wavelength bands, and transmittance of green light is higher than that of blue light and red light; and a wavelength band range of a red filter plate may be about 550 nm in a lower cut-off wavelength band, and transmittance of red light is higher than that of green light and blue light.

The embodiment of the present application does not specifically limit the edge region of the fingerprint sensor. For example, the edge region of the fingerprint sensor may be a region where at least one circle of sensing units of an outermost side of the fingerprint sensor is located. For example, the edge region of the fingerprint sensor may be a region where one circle of sensing units of an outermost side of the fingerprint sensor is located, as shown in FIGS. 5 to 8. Or, the edge region of the fingerprint sensor may be a region where two circles of sensing units of an outermost side of the fingerprint sensor are located. Or, the edge region of the fingerprint sensor may be a region where three circles of sensing units of an outermost side of the fingerprint sensor are located. Of course, the edge region of the fingerprint sensor may be a region where one and a half circles of sensing units of an outermost side of the fingerprint sensor are located.

Since in the present application, the middle region of the fingerprint sensor is used for fingerprint imaging, in order to ensure that the middle region may obtain a fingerprint image as complete as possible, an area of the middle region may not be smaller than a certain threshold value. Therefore, the area and shape of the middle region may be set according to needs of a practical application.

For example, an area of the middle region may be set to be greater than that of the edge region, that is, a ratio of an area of the middle region to an area of the edge region is greater than 1 or greater than X, and X is greater than 1.

The embodiment of the present application does not limit the shapes of the middle region and the edge region. For example, the shape of the middle region may be various shapes such as a circle, an oval, a square, and a diamond. The edge region may be a region outside the middle region.

Optionally, the first filter layer may only include a plurality of first filter units, and the first filter layer is a hollow structure, and a hollow region is a region corresponding to the middle region of the fingerprint sensor, that is, the first filter layer may be an annular structure surrounded by the plurality of first filter units. As shown in FIG. 8, a region 720 may be a hollow region.

Optionally, the first filter layer may also include a transparent region in addition to the plurality of first filter units, and the transparent region is a region of the first filtering layer corresponding to the middle region of the fingerprint sensor, and sensing units of the middle region of the fingerprint sensor are configured to receive a light signal returned by the finger and passing through the transparent region to generate a fingerprint image of the finger. As shown in FIG. 8, the region 720 may be a transparent region of the first filter layer.

The transparent region may be understood as a region where the light signal returned by the finger is not filtered, or the transparent region may represent a region where transmittance of the light signal is greater than a preset value. The transparent region may transmit most of light signals returned by the finger. In this case, the fingerprint identification apparatus may perform fingerprint image matching using a white light signal.

Optionally, as shown in FIG. 5, the first filter layer 420 may also include a plurality of second filter units 422 in addition to the plurality of first filter units 421. The plurality of second filter units 422 are disposed in a region of the first filter layer 420 corresponding to the middle region of the fingerprint sensor 400. The plurality of second filter units 422 are configured to filter a light signal returned by the finger.

Colors of the second filter units 422 and colors of the first filter units 421 are different.

If the first filter units include filter units in multiple colors, colors of the second filter units are different from a color of any one of the filter units of the first filter units. For example, if the first filter units include a red filter unit and a blue filter unit, the second filter units are filter units other than the red filter unit and the blue filter unit. Or, if the first filter units include filter units in multiple colors, colors of the second filter units are different from colors of part of the first filter units. For example, if the first filter units include a red filter unit and a green filter unit, the second filter unit may be a green filter unit.

The second filter units may be monochromatic filter units, that is, the second filter units may be configured to transmit a light signal in a specific color. For example, the second filter units may be green filter units, that is, the second filter units only allow the green light signal in the light signal returned by the finger to be transmitted, and the sensing units of the middle region of the fingerprint sensor may receive the green light signal, and the green light signal is used to generate the fingerprint image of the finger.

As an example, the first filter units may include a red filter unit and a blue filter unit, and the second filter units include green filter units. In this case, the fingerprint identification apparatus may use red and blue light signals to detect whether a finger is a real finger, and use a green light signal to perform fingerprint image matching. As shown in FIGS. 6 and 7, the first filter layer includes a red filter unit and a blue filter unit, and a region 620 surrounded by the red filter unit and the blue filter unit is provided with a green filter unit.

Generally, compared with red and blue light wavelength bands, fingerprint identification performance is better by using the fingerprint image in a green light wavelength band for fingerprint identification, and therefore, the second filter unit may preferably use a green filter unit. In this case, in order to reduce the influence of the first filter units on fingerprint identification performance, the green filter unit shall be avoided in the first filter units.

Optionally, the second filter units may be configured to filter out an infrared light signal to prevent the infrared light signal in the environment from reaching the fingerprint sensor to affect fingerprint detection performance. As an example, the second filter units may only be configured to filter out the infrared signal and transmit other non-infrared signals. As another example, the second filter units are not only configured to filter out the infrared light signal, but also allow a light signal in a certain specific color to be transmitted. For example, the second filter units are not only configured to filter out the infrared light signal, but also allow only a green light signal to be transmitted.

One filter unit in the first filter layer in the embodiment of the present application may correspond to one sensing unit in the fingerprint sensor, and the one sensing unit may be configured to receive a light signal returned by the finger and filtered by the corresponding one filter unit.

The shapes of the filter units shown in FIGS. 3 to 7 are all square, but this is only an example, and the shapes of the filter units may also be a circle, an ellipse, a semicircle, or other shapes.

The fingerprint identification apparatus in the embodiment of the present application may further include a second filter layer, and the second filter layer is disposed above the fingerprint sensor and may be configured to filter out an infrared light signal. When fingerprint identification is performed on the finger, an infrared signal in the environment (such as an infrared signal in sunlight) passes through the finger and reaches the fingerprint sensor, and thus the fingerprint identification performance will be affected. Therefore, in the embodiment of the present application, the influence of the infrared light signal on fingerprint identification performance may be reduced by adding the second filter layer.

The second filter layer may be disposed between the first filter layer and the fingerprint sensor, or may be disposed above the first filter layer, which is not specifically limited in the embodiment of the present application. The second filter layer may be a layer of filter film formed on a surface of the fingerprint sensor by a film plating process.

In addition, the second filter units in the first filter layer may also have a function of filtering out the infrared signal, and a combination of the second filter units and the second filter layer could enhance a filtering effect of the infrared signal.

The fingerprint identification apparatus may further include a micro-lens array, the micro-lens array may be disposed above the first filter layer and is configured to converge the light signal returned by the finger to sensing units of the fingerprint sensor.

The fingerprint identification apparatus may further include at least one light shielding layer, and the at least one light shielding layer is disposed between the micro-lens array and the fingerprint sensor, each of the at least one light shielding layer is provided with an array of small holes, and the array of small holes is configured to guide the light signal converged by the micro-lens array to sensing units of the fingerprint sensor.

When the fingerprint identification apparatus includes a plurality of light shielding layers, the plurality of light shielding layers may not be adjacent. For example, a first filter layer and/or a second filter layer is inserted between two light shielding layers.

Figure 9:
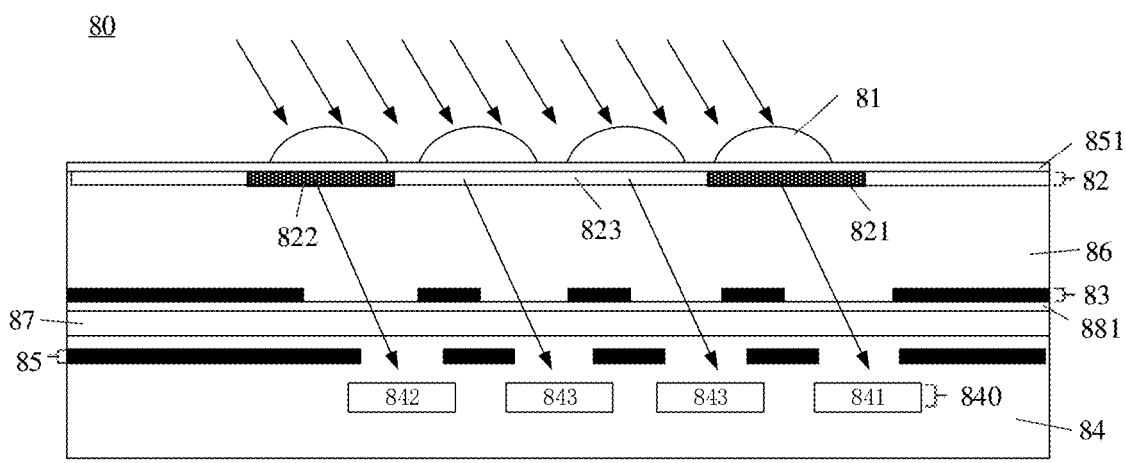
FIG. 9 is a schematic structural diagram of another fingerprint identification apparatus provided by an embodiment of the present application.

With reference to FIG. 9, a specific fingerprint identification apparatus according to an embodiment of the present application will be described hereinafter. FIG. 9 is a schematic side sectional diagram of a fingerprint identification apparatus 80 according to an embodiment of the present application.

As shown in FIG. 9, the fingerprint identification apparatus 80 may include a micro-lens array, at least one light shielding layer located under the micro-lens array, and a fingerprint sensor 84 located under the at least one light shielding layer. The micro-lens array may include a plurality of micro-lenses 81 distributed in an array, the at least one light shielding layer may include a light shielding layer 83 and a light shielding layer 85, and the fingerprint sensor may include a plurality of sensing units 840 distributed in an array. The micro-lens array is configured to be disposed under the display screen; the at least one light shielding layer is disposed under the micro-lens array, and each of the at least one light shielding layer is provided with an array of small holes; and an array of sensing units is disposed under the array of small holes of a bottommost light shielding layer in the at least one light shielding layer. For example, a small hole in the array of small holes in the bottommost light blocking layer is one-to-one corresponding to a sensing unit in the array of sensing units.

The micro-lens array may include a plurality of micro-lenses distributed in an array, and each of the plurality of micro-lenses may be a hemispherical lens or a non-hemispherical lens, such as a square lens. In some embodiments, the at least one light shielding layer is a plurality of light shielding layers, and one opening in the array of small holes in a topmost light shielding layer of the plurality of light shielding layers corresponds to one or more sensing units in the array of sensing units. Optionally, apertures of the openings corresponding to the same sensing unit in the plurality of light shielding layers are sequentially reduced from top to bottom. In other embodiments, the at least one light shielding layer is one light shielding layer, and a thickness of the light shielding layer is greater than a preset threshold value to ensure imaging quality. Optionally, a metal wiring layer of the fingerprint sensor is disposed at a rear focal plane position of the micro-lens array, and the metal wiring layer is provided with an opening above each sensing unit in the array of sensing units to form the bottommost light shielding layer, such as a light shielding layer 85 shown in FIG. 9.

As shown in FIG. 9, in some embodiments of the present application, the fingerprint identification apparatus 80 may further include a first filter layer 82. The first filter layer 82 includes a plurality of first filter units configured to transmit a light signal in at least one color; in other words, the first filter unit may include a filter unit for transmitting the light signal in at least one color. As shown in FIG. 9, the first filter unit may include a filter unit 821 and a filter unit 822. Colors of the filter unit 821 and the filter unit 822 may be the same, for example, both the filter unit 821 and the filter unit 822 are red filter units; or, colors of the filter unit 821 and the filter unit 822 may be different, for example, the filter unit 821 is a red filter unit and the filter unit 822 is a blue filter unit.

The plurality of first filter units are disposed in a region of the first filter layer 82 corresponding to sensing units in an edge region of the plurality of sensing units 840. For example, the filter unit 822 corresponds to a sensing unit 842, and the sensing unit 842 is configured to receive a light signal returned by a finger and filtered by the filter unit 822. The filter unit 821 corresponds to a sensing unit 841, and the sensing unit 841 is configured to receive a light signal returned by the finger and filtered by the filter unit 821. The light signals received by the sensing unit 841 and the sensing unit 842 may be configured to detect whether the finger is a real finger.

The first filter layer 82 may further include a region 823, which is a region corresponding to sensing units in a middle region of the plurality of sensing units 840. For example, the region 823 is a region corresponding to sensing units 843, and the sensing units 843 may be configured to receive a light signal returned by the finger and passing through the region 823. The light signal received by the sensing units 843 may be used to generate a fingerprint image of the finger to perform fingerprint image matching.

The region 823 may be a transparent region or a hollow region, and in this region, the light signal returned by the finger may not be filtered. In this case, the light signal received by the sensing units 843 may be a white light signal. For example, the transparent region may be a medium whose transmittance for red, green and blue light signals is greater than or equal to a preset threshold value. The hollow region represents that the region 823 is an air gap.

The region 823 may include a plurality of second filter units, the plurality of second filter units may filter the light signal returned by the finger, and the sensing units 843 may be configured to receive a light signal returned by the finger and filtered by the second filter units. For example, the second filter units may be configured to filter an infrared light signal and/or transmit only a light signal in a certain color. As an optional implementation manner, the second filter units only allow a green light signal to be transmitted. In this case, the sensing units 843 receive a green light signal, and the green light signal is used to generate the fingerprint image of the finger.

Whether the finger above the display screen is a real finger may be determined through the light signal captured by the sensing unit 841 and the sensing unit 842, and the fingerprint image for fingerprint identification may be obtained through the light signal captured by the sensing units 843. That is, the fingerprint identification apparatus captures the fingerprint image once, which may not only be used for authenticity identification, but also for fingerprint identification, and the security of fingerprint identification could be improved without affecting a fingerprint identification effect. In addition, there is no need to fill data captured by the sensing unit 841 and the sensing unit 842 in a fingerprint identification process, which could simplify a fingerprint identification process and improve the speed of fingerprint identification.

When the first filter units include filter units in one color, since different materials or fingers of different users have different reflection and scattering degrees on a light signal in the same color, the authenticity of the fingerprint image may be determined according to the intensity of the light signal received by the sensing unit 842 and the sensing unit 841, thus improving the security of fingerprint identification.

When the first filter units include filter units in two or more colors, different materials or fingers of different users have different reflection and scattering degrees on light signals in different colors, and therefore the intensity differences between the light signals in different colors are compared, such as the intensity differences between the light signals received by the sensing unit 842 and the sensing unit 841, to determine the authenticity of the fingerprint image, thus improving the security of fingerprint identification.

It should be noted that the first filter layer 82 may be disposed above the micro-lens array, or the first filter layer 82 may be disposed between the micro-lens array and the fingerprint sensor 84.

In some embodiments of the present application, reference is continuously made to FIG. 9, the fingerprint identification apparatus 80 may further include a transparent medium layer 86. The transparent medium layer 86 may be configured to connect the micro-lens array, at least one light shielding layer and the fingerprint sensor. For example, the transparent medium layer 86 is configured to connect the first filter layer 82, the light shielding layer 83, the light shielding layer 85 and the fingerprint sensor 84.

In some embodiments of the present application, reference is continuously made to FIG. 9, the fingerprint identification apparatus 80 may further include a first bonding layer 851 configured to bond the micro-lens array to an upper surface of the first filter layer 82. The first bonding layer 851 may be any form of transparent adhesive to reduce loss of light signals during transmission.

In some embodiments of the present application, reference is continuously made to FIG. 9, the fingerprint identification apparatus 80 may further include a first planarized layer 881 disposed above the array of sensing units, so as to facilitate the setting of the light shielding layer 83.

The fingerprint identification apparatus 80 may further include an infrared filter layer 87, the infrared filter layer 87 may be disposed above the micro-lens array or disposed between the micro-lens array and the fingerprint sensor 84, and the infrared filter layer 87 may be configured to filter out infrared light signal. Optionally, the first planarized layer 881 is disposed on an upper surface of the infrared filter layer 87. The infrared filter layer 87 may be disposed on an upper surface of the fingerprint sensor 84. For example, the infrared filter layer 87 may be directly plated on the upper surface of the fingerprint sensor 84 by a film plating method.

Optionally, the number of filter units for transmitting a red light signal in the plurality of first filter units is greater than the number of filter units for transmitting light signals in other colors.

The number of filter units for transmitting a red light signal is designed to be greater than the number of filter units for transmitting light signals in other colors, so that even if an infrared filter layer is disposed between the first filter layer and the array of sensing units in the fingerprint identification apparatus, it may be ensured that a red fingerprint image for identifying a real or fake fingerprint has sufficient brightness, which could improve an identification effect of the red fingerprint image.

The light shielding layer shown in FIG. 9 is configured to guide an inclined light signal, but the embodiment of the present application is not limited thereto, and the light shielding layer may also be configured to guide a vertical light signal. The vertical light signal represents a light signal perpendicular to a surface of the fingerprint sensor.

It should be understood that the positional relationship among various components or devices in FIG. 9 is only an example, and appropriate modifications that can achieve the design requirements of the present application are within the protection scope of the present application.

Figure 10:
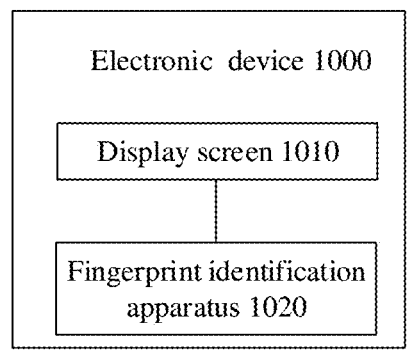
FIG. 10 is a schematic block diagram of an electronic device provided by an embodiment of the present application.

FIG. 10 is a schematic block diagram of an electronic device provided by an embodiment of the present application. An electronic device 1000 includes a display screen 1010 and a fingerprint identification apparatus 1020. The fingerprint identification apparatus 1020 may be disposed under the display screen 1010 to perform fingerprint identification on a finger above the display screen 1010.

The display screen 1010 may be any display screen described above, and the display screen 1010 for example, may be a self-luminous display screen, such as an OLED screen.

The fingerprint identification apparatus 1020 may be any one of fingerprint identification apparatuses described above, which will not be repeatedly described here to simplify the description.

It should be noted that the sensor chip in the embodiment of the present application may also be referred to as a fingerprint sensor.

It should be noted that terms used in embodiments of the present application and the claims appended hereto are merely for the purpose of describing particular embodiments, and are not intended to limit the embodiments of the present application.

For example, the use of a singular form of "a", "the", "the foregoing" and "said" in the embodiments of the present application and the claims appended hereto are also intended to include a plural form, unless otherwise clearly indicated herein by context.

A person skilled in the art may be aware that, units and algorithm steps of the examples described in the embodiments disclosed in the text may be implemented by electronic hardware or a combination of computer software and the electronic hardware. Whether these functions are implemented in the form of hardware or software depends upon particular application of the technical solutions and constraint conditions of design. A person skilled in the art may use different methods to implement the described functions for each particular application, but it should not be considered that the implementation goes beyond the scope of the embodiments of present application.

If the function is implemented in the form of the software functional unit and is sold or used as an independent product, it may be stored in a computer readable storage medium. Based on such understanding, the technical solution of the embodiments of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes a variety of media capable of storing program codes, such as a USB disk, a mobile hard disk, a read-only memory, a random access memory, a magnetic disk, an optical disk or the like.

It may be clearly understood by a person skilled in the art that, for the purpose of convenient and brief description, for a detailed working process of the foregoing device, apparatus, and unit, reference may be made to a corresponding process in the foregoing method embodiments, and details are not described herein again.

In the several embodiments provided in the present application, it should be understood that the disclosed electronic device, apparatus and method may be implemented in other manners.

For example, the units, modules or components in the apparatus embodiments described above could be divided according to logical functions, or other division manners for practical implementations. For example, multiple units, modules or components may be combined or integrated into another system, or some units, modules or components may be neglected or may not be performed.

For another example, the units/modules/components described above as separation/display components may or may not be physically separated, that is, they may be located in one place or may be distributed on a plurality of network units. Part of or all of the units/modules/components may be selected according to a practical need to achieve the objectives of the embodiments of the present application.

Finally, it should be noted that the displayed or discussed mutual couplings or direct couplings or communication connections may be implemented by using some interfaces. The indirect couplings or communication connections between the apparatuses or units may be implemented in electrical, mechanical, or other forms.

The foregoing contents are merely specific implementation manners of the embodiments of the present application. However, the protection scope of the embodiments of the present application is not limited thereto, and a person skilled in the art who is familiar with the art could readily think of variations or substitutions within the technical scope disclosed by the embodiments of the present application, and these variations or substitutions shall fall within the protection scope of the embodiments of the present application. Therefore, the protection scope of the embodiments of the present application shall be subject to the protection scope of the claims.

What is claimed is:

1. A fingerprint identification apparatus, wherein the fingerprint identification apparatus is used to be disposed under a display screen and comprises:
   a fingerprint sensor;
   a first filter layer, disposed above the fingerprint sensor, the first filter layer comprises a plurality of first filter units, and the plurality of first filter units are disposed in a region of the first filter layer corresponding to an edge region of the fingerprint sensor, wherein the first filter units at least comprise a red filter unit; or the first filter units comprise filter units in at least one color, the at least one color comprise a red filter unit, a green filter unit, a blue filter unit, a cyan filter unit and a yellow filter unit; and
   a second filter layer, disposed between the first filter layer and the fingerprint sensor and is configured to filter out an infrared light signal.

2. The fingerprint identification apparatus according to claim 1, wherein sensing units of a middle region of the fingerprint sensor are configured to receive a light signal returned by the finger, to generate a fingerprint image of the finger, and an area of the middle region of the fingerprint sensor is greater than that of the edge region of the fingerprint sensor.

3. The fingerprint identification apparatus according to claim 1, wherein the edge region of the fingerprint sensor is a region where at least one circle of sensing units of an outermost side of the fingerprint sensor is located.

4. The fingerprint identification apparatus according to claim 1, wherein the first filter units comprise a red filter unit, a green filter unit and a blue filter unit.

5. The fingerprint identification apparatus according to claim 1, wherein the first filter units is red filter unit.

6. The fingerprint identification apparatus according to claim 1, wherein the second filter layer is a layer of filter film formed on a surface of the fingerprint sensor.

7. The fingerprint identification apparatus according to claim 1, wherein the first filter layer further comprises a transparent region, and the transparent layer is a region of the first filter layer corresponding to the middle region of the fingerprint sensor, and
   the sensing units of the middle region of the fingerprint sensor are configured to receive a light signal returned by the finger and passing through the transparent region to generate a fingerprint image of the finger.

8. The fingerprint identification apparatus according to claim 1, wherein the first filter layer further comprises a plurality of second filter units, and the plurality of second filter units are disposed in a region of the first filter layer corresponding to the middle region of the fingerprint sensor, wherein the plurality of second filter units and the plurality of first filter units are different in color, and the sensing units of the middle region of the fingerprint sensor are configured to receive a light signal returned by the finger and filtered by the plurality of second filter units to generate a fingerprint image of the finger.

9. The fingerprint identification apparatus according to claim 8, wherein the second filter units are monochromatic filter units and configured to filter out an infrared light signal.

10. The fingerprint identification apparatus according to claim 8, wherein the second filter units are green filter units.

11. The fingerprint identification apparatus according to claim 1, wherein one filter unit in the first filter layer corresponds to one sensing unit in the fingerprint sensor, and the one sensing unit is configured to receive a light signal returned by the finger and filtered by the corresponding one filter unit.

12. The fingerprint identification apparatus according to claim 1, further comprising, a micro-lens array being disposed above the first filter layer and is configured to converge the light signal returned by the finger to sensing units of the fingerprint sensor; and at least one light shielding layer being disposed between the micro-lens array and the fingerprint sensor, each of the at least one light shielding layer is provided with an array of small holes, and the array of small holes is configured to guide the light signal converged by the micro-lens array to sensing units of the fingerprint sensor.

13. The fingerprint identification apparatus according to claim 12, wherein a metal wiring layer is disposed inside the fingerprint sensor, and the metal wiring layer is one of the at least one light shielding layer.

14. The fingerprint identification apparatus according to claim 13, wherein the metal wiring layer of the fingerprint sensor is disposed at a rear focal plane position of the micro-lens array, and the metal wiring layer is provided with an opening above each sensing unit in the fingerprint sensor to form the bottommost light shielding layer.

15. The fingerprint identification apparatus according to claim 1, wherein sensing units of the edge region of the fingerprint sensor are configured to receive a light signal returned by a finger above the display screen and filtered by the plurality of first filter units.

16. The fingerprint identification apparatus according to claim 15, wherein the light signal returned by the finger above the display screen and filtered by the plurality of first filter units is to detect whether the finger is a real finger.

17. An electronic device, comprising:

a display screen; and the fingerprint identification apparatus according to claim 1, wherein the fingerprint identification apparatus is disposed under the display screen.

* * * * *